(12) United States Patent
Buruganahalli et al.

(10) Patent No.: US 9,680,795 B2
(45) Date of Patent: *Jun. 13, 2017

(54) DESTINATION DOMAIN EXTRACTION FOR SECURE PROTOCOLS

(71) Applicant: Palo Alto Networks, Inc., Santa Clara, CA (US)

(72) Inventors: Shivakumar Buruganahalli, San Jose, CA (US); Song Wang, Palo Alto, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,653

(22) Filed: Jun. 30, 2016

(65) Prior Publication Data

US 2016/0359807 A1 Dec. 8, 2016

Related U.S. Application Data

(63) Continuation of application No. 13/951,320, filed on Jul. 25, 2013, now Pat. No. 9,419,942.

(60) Provisional application No. 61/831,391, filed on Jun. 5, 2013.

(51) Int. Cl.
*H04L 29/06* (2006.01)

(52) U.S. Cl.
CPC ........ *H04L 63/0236* (2013.01); *H04L 63/029* (2013.01); *H04L 63/0227* (2013.01); *H04L 63/0245* (2013.01); *H04L 63/0428* (2013.01); *H04L 63/101* (2013.01); *H04L 63/1416* (2013.01)

(58) Field of Classification Search
CPC .................................................. H04L 63/0227
See application file for complete search history.

(56) References Cited

U.S. PATENT DOCUMENTS 7,849,502 B1 * 12/2010 Bloch ................. H04L 12/2602
726/11
8,327,128 B1 * 12/2012 Prince ................ H04L 63/0823
713/150

(Continued)

*Primary Examiner* — Harunur Rashid
*Assistant Examiner* — Thanh Le
(74) *Attorney, Agent, or Firm* — Van Pelt, Yi & James LLP

(57) ABSTRACT

Techniques for destination domain extraction for secure protocols are disclosed. In some embodiments, destination domain extraction for secure protocols includes monitoring network communications between a client and a remote server; determining if the client sends a request to create a secure connection with the remote server (e.g., in which the network communications are initiating a setup for a secure protocol-based connection); and extracting a destination domain from the request to create the secure connection with the remote server. In some embodiments, the secure protocol is a secure sockets layer (SSL) protocol or transport layer security (TLS) protocol, and the destination domain is extracted from the server name indication (SNI) of a client hello message sent from the client to the remote server. In some embodiments, destination domain extraction for secure protocols further includes applying a policy (e.g., a security policy) based on the destination domain to filter traffic using a security device.

10 Claims, 8 Drawing Sheets

(56) References Cited

U.S. PATENT DOCUMENTS

| | | | |
|---|---|---|---|
| 2004/0015725 A1* | 1/2004 | Boneh | H04L 63/166 713/160 |
| 2009/0037976 A1* | 2/2009 | Teo | G06F 21/566 726/1 |
| 2013/0239189 A1* | 9/2013 | Ionescu | H04W 12/06 726/6 |
| 2013/0262655 A1* | 10/2013 | Deschênes | H04L 43/12 709/224 |

* cited by examiner

DESTINATION DOMAIN EXTRACTION FOR SECURE PROTOCOLS

CROSS REFERENCE TO OTHER APPLICATIONS

This application is a continuation of co-pending U.S. patent application Ser. No. 13/951,320, entitled DESTINATION DOMAIN EXTRACTION FOR SECURE PROTOCOLS filed Jul. 25, 2013 which is incorporated herein by reference for all purposes, which claims priority to U.S. Provisional Patent Application No. 61/831,391 entitled DESTINATION DOMAIN EXTRACTION FOR SECURE PROTOCOLS filed Jun. 5, 2013, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
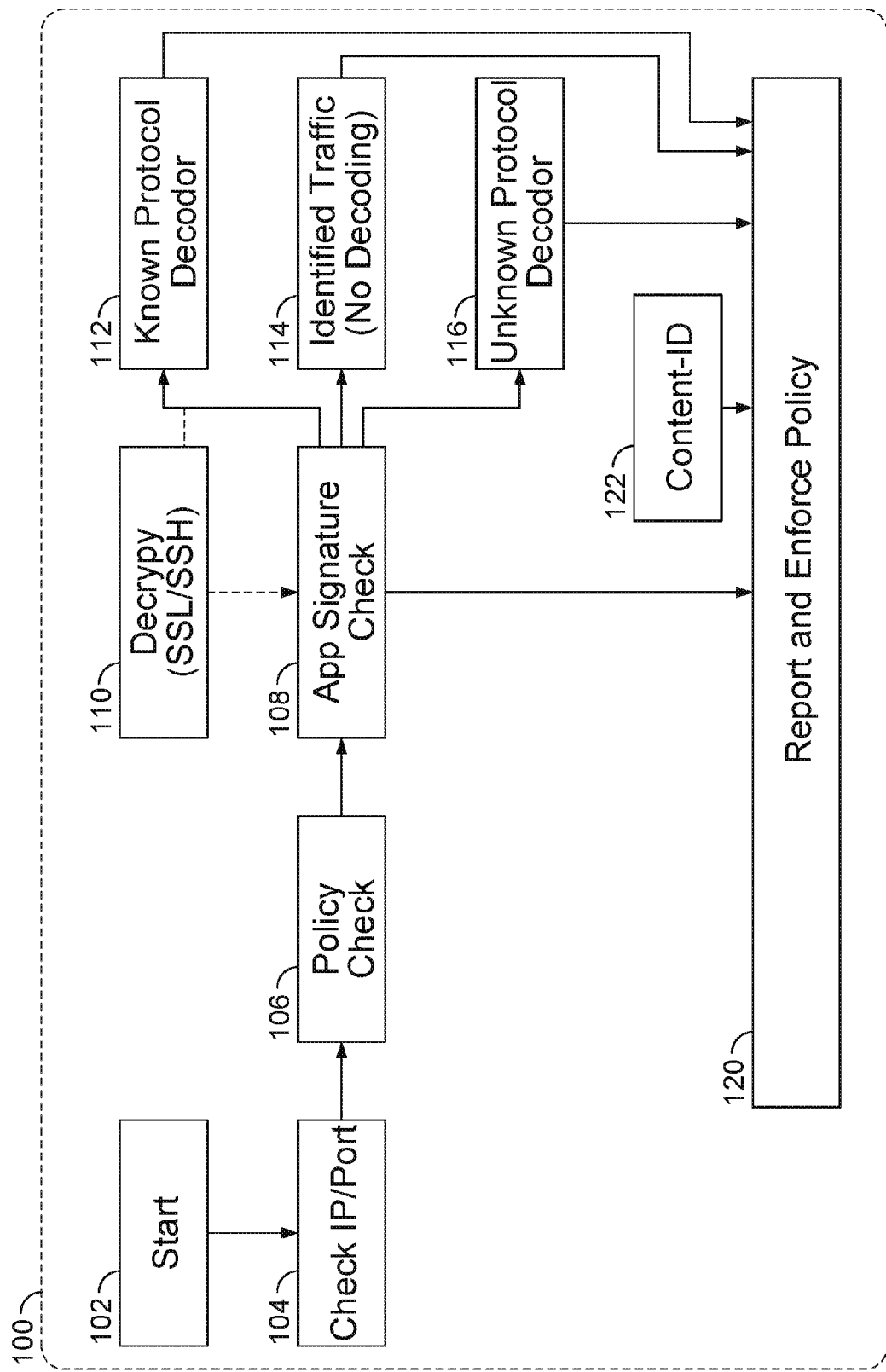
FIG. 1 is a functional diagram of an architecture of a security device that can be used for destination domain extraction for secure protocols in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances, generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, secure protocols can be used to evade detection by security devices, such as firewalls, by encrypting data communications between a client and a remote server (e.g., an external site, such as a remote web site/web service). As a result, techniques for decrypting such secure communications are needed in order to monitor such encrypted data communications and to apply filtering based on a policy.

However, it is generally desirable for a security device (e.g., a firewall device or other types of security devices) to extract information about the destination domain for any given new flow (e.g., new session) as early as possible. For example, information about the destination domain can be critical as well as relevant for security processing based on which policies and a set of actions that can be applied to the flow.

While performing various decryption techniques as described herein can facilitate applying filtering based on a policy (e.g., a security policy, such as a firewall policy), it would be desirable and efficient to further facilitate policy-based filtering on such data communication flows (e.g., sessions) prior to the set-up of the encrypted data communication for such flows (e.g., to monitor the initial unencrypted/clear text data communications exchanged as part of an initial handshake to setup a secure connection for a new session between a client and a remote server, which is prior to the establishment of the secure communication channel/tunnel after which any data communications intercepted between the client and the remote server would be encrypted).

Thus, what are needed are techniques for destination domain extraction for secure protocols (e.g., protocols that facilitate encrypted data communications). Accordingly, techniques for destination domain extraction for secure protocols (e.g., secure sockets layer (SSL), transport layer security (TLS), and/or other secure protocols) are disclosed.

Protocols like SSL/TLS pose a challenge, because data is encrypted and information about the destination domain is not readily available. This information could be determined by looking at other messages or waiting until application data associated with the flow is decrypted. Another challenge is basing the destination domain information solely on the IP address is often not accurate, because it is possible that a single IP address in the cloud can be hosting multiple virtual domains. As part of a TLS protocol exchange, a client hello is generally the first message sent by a client to a remote server. It is possible that a server in the cloud, with a single IP address, can be hosting multiple domains, and there is no easy way for the client to indicate to the server as to which domain he is trying to connect. As further discussed below, a Server Name Indication (SNI) was added as part of the TLS protocol standard extension to the client hello message in order to allow the remote server to overcome this ambiguity. Based on this information, the hosting server can present the corresponding domain's server certificate to the requesting client. The SNI extension is supported by most of the browsers as well as numerous open source tools.

Thus, SNI is an extension to the TLS protocol that indicates what hostname (e.g., destination domain) that the client is attempting to connect to at the start of the handshaking process for setting a secure TLS communication channel/session between a client and a remote server. This standard extension for SNI was developed to allow a server to present multiple certificates on the same IP address and port number and, as a result, allows multiple secure (HTTPS) websites (e.g., and/or any other service over TLS) to be served using the same IP address without requiring all those sites to use the same certificate. In particular, SNI addresses this issue by sending the name of the virtual domain as part of the TLS negotiation. This enables the server to select the correct virtual domain early and present the browser with the certificate containing the correct name. Therefore, with clients and servers that support SNI, a single IP address can be used to serve a group of domain names for which it is impractical to get a common certificate.

In some embodiments, the SNI standard extension is used as disclosed herein as a mechanism to facilitate destination domain extraction for secure protocols without requiring decryption. For example, a firewall can intercept and monitor data communications from a client and a remote server in order to extract the hostname data from the SNI field (e.g., server name field of the SNI extension), which is sent as an unencrypted data communication from the client (e.g., a web browser executing on the client) to the remote server (e.g., at the start of the handshaking process for setting up a secure TLS communication channel/session between a client and a remote server). This extracted hostname data (e.g., destination domain) can then be used by the firewall to perform an action(s) based on a firewall policy (e.g., the domain name can be extracted by parsing the client hello message to extract the host name from the server_name field of the SNI extension, which can then be used to apply firewall policies or take responsive actions based on this information without having to wait for data to be decrypted), as further described herein with respect to various embodiments. Also, such SNI information is available in the first packet of this handshaking process, such that a policy (e.g., a security or firewall policy using the hostname information extracted from the SNI information) can be applied sooner based on this early extraction of the hostname from the SNI information such that the rest of the stream can be forwarded without any decryption resulting in less state to track thereby enhancing performance (e.g., of the security device, such as a firewall).

As another example, the extracted destination domain can also be used to determine whether the destination domain extracted from the server name indication (SNI) of the client hello message sent from the client to the remote server matches a domain identified in a public certificate sent from the remote server to the client. In some cases, the application cannot be identified correctly, and the stream (e.g., flow) can be set to "unidentified-tcp", and in such cases, the SNI information can be used to tentatively identify application, based on destination domain, as "tentative-app-id".

Various techniques described herein can be used to determine whether a new session using a secure protocol violates a policy (e.g., security policy, such as a firewall policy). For example, if a new flow is determined to violate a policy prior to the set-up of the encrypted data communication for that flow between a client and a remote server, then the flow can be blocked and decryption is not required. As an example, Bob who is a user (e.g., an employee) of ACME Company may attempt to logon using a web browser executing on his desktop office computer to a remote server that is associated with the online banking site (e.g., web site) of Banking Corporation. If the firewall policy of ACME Company has white listed the domain associated with the Banking Corporation as a trusted domain, then Bob's connection (e.g., an SSL/TLS session) with the web site for the Banking Corporation can be allowed using various techniques described herein.

Various techniques described herein can also be used to determine whether a new session using a secure protocol should be initially allowed based on a policy (e.g., security policy, such as a firewall policy), and then to further monitor encrypted data communications associated with the session. For example, if a flow is initially determined to be permissible based on a policy prior to the set-up of the encrypted data communication for that flow between a client and a remote server, then the flow can be allowed, and a policy may require that the session be decrypted for further analysis and further potential filtering based on the policy. As an example, Alice who is another user (e.g., another employee) of ACME Company may attempt to connect (e.g., an attempt to establish an SSL session) to a remote server (e.g., external site, such as a third party web site/web service) using a web browser executing on her laptop or other mobile computing connected to a corporate network of ACME Company, but in this case, the remote server is determined to be associated with an unknown site (e.g., a domain that is not on a white list of the firewall policy and also not on a black list of the firewall policy). In this example, the firewall can be configured to allow the connection and can also be configured to further monitor the encrypted data communications of that session between Alice's laptop and the remote server in order to determine whether or not further action(s) should be performed based on the firewall policy using various techniques described herein.

Various techniques described herein can also be used to extract destination domain information (e.g., from the SNI field of a client hello message of a set-up of a TLS session) and to correlate that extracted destination domain information with other information (e.g., other fields of the client hello can be used for relevant data/security analysis). For example, the information extracted from the SNI field can be correlated to the id-at-commonName of the certificate received from the remote server (e.g., external web server). If the SNI name and the commonName from the certificate are determined to not match (e.g., to be different), then the security device (e.g., firewall) can trigger this event as suspicious and use this for further correlation (e.g., to share with a security cloud service), such as from other messages of that and/or other flows. As an example, the extracted destination domain information possibly along with other extracted information (e.g., mismatches with the commonName from the certificate) can be provided to a security cloud service that can facilitate identification of new, zero-day threats, new vulnerabilities, prevent false positives, and/or provide a feedback loop for any of such activities or trends aggregated and correlated using the security cloud service.

Various techniques described herein can also be applied to efficiently handle a session resumption (e.g., resumption of an SSL/TLS session) that does not involve any server certificate exchange. For example, in such a scenario it can be challenging to determine the domain name unless the data communications of that resumed session are decrypted.

Using the techniques described herein allow for the resumed session to be associated with a destination domain without requiring decryption of such data communications. For example, in the case of a session resumption, there is a client hello message followed by server hello but no certificate is provided from the server (e.g., as it was previously sent to the client at the previous handshake for the initial session setup). In such cases, the security device (e.g., firewall) can use the SNI field for applying a policy.

These and other examples are further described herein with respect to various embodiments.

In some embodiments, destination domain extraction for secure protocols includes monitoring network communications between a client and a remote server; determining if the client sends a request to create a secure connection with the remote server (e.g., in which the network communications are initiating a setup for a secure protocol-based connection); and extracting a destination domain from the request to create the secure connection with the remote server. In some embodiments, the secure protocol is a secure sockets layer (SSL) protocol or transport layer security (TLS) protocol, and the destination domain is extracted from the server name indication (SNI) of a client hello message sent from the client to the remote server (e.g., the client hello message is an unencrypted communication). In some embodiments, destination domain extraction for secure protocols further includes applying a policy (e.g., a security policy) based on the destination domain to filter traffic at a security device.

In some embodiments, destination domain extraction for secure protocols further includes determining whether the destination domain extracted from the server name indication (SNI) of a client hello message sent from the client to the remote server matches a domain identified in a public certificate sent from the remote server to the client. In some embodiments, destination domain extraction for secure protocols further includes performing an action using a policy based on the destination domain.

In some embodiments, destination domain extraction for secure protocols further includes applying a security policy based on the destination domain to filter traffic at the security device. For example, the security policy can include a malware detection policy, a whitelist/blacklist policy (e.g., in which a session associated with the network communications between the client and the remote server are not decrypted if the destination domain is included in the whitelist, and a session associated with the network communications between the client and the remote server are decrypted if the destination domain is included in the blacklist), and/or a uniform resource locator (URL)/category filtering policy.

In some embodiments, destination domain extraction for secure protocols further includes applying a security policy based on the destination domain to filter traffic at the security device, in which the security policy includes a whitelist/blacklist policy, and in which a session associated with the network communications between the client and the remote server are not decrypted if the destination domain is included in a whitelist of the whitelist/blacklist policy.

In some embodiments, destination domain extraction for secure protocols further includes applying a security policy based on the destination domain to filter traffic at the security device, in which the security policy includes a whitelist/blacklist policy, and in which a session associated with the network communications between the client and the remote server are decrypted if the destination domain is included in a blacklist of the whitelist/blacklist policy.

In some embodiments, destination domain extraction for secure protocols further includes applying a security policy based on the destination domain to filter traffic at the security device, in which a session associated with the network communications between the client and the remote server are decrypted to verify that the destination domain name extracted from a server name indication matches the domain associated with a uniform resource locator (URL) for a session associated with the network communications between the client and the remote server.

In some embodiments, destination domain extraction for secure protocols further includes decrypting the monitored encrypted network communications of a session associated with the network communications between the client and the remote server to verify that the destination domain name extracted from a server name indication matches the domain associated with a URL for the session associated with the network communications between the client and the remote server. For example, this technique can be used in order to detect malware that attempts to fool a hosting site by including false destination domain information (e.g., in the SNI field in a client hello message of an initial set-up of a TLS session).

In some embodiments, destination domain extraction for secure protocols further includes intercepting a request to establish an encrypted session from the client to the remote server; sending a request to establish the encrypted session on behalf of the client to the remote server; sending an encrypted session response to the client on behalf of the remote server using a session key associated with the firewall device; decrypting encrypted traffic between the client and the remote server to monitor for a request from the client to create a tunnel using the first protocol with the remote server; allowing the request to create the tunnel; monitoring decrypted session traffic between the client and the remote server over the tunnel based on one or more firewall policies; and blocking the session traffic if a violation of a first firewall policy is determined, in which the first firewall policy includes a policy for verifying that the destination domain name extracted from a server name indication matches the domain associated with a URL for a session associated with the network communications between the client and the remote server.

In some embodiments, destination domain extraction for secure protocols further includes monitoring encrypted network communications between a client and a remote server (e.g., using a security device, such as a firewall to provide man-in-the-middle decryption techniques, such as described herein), in which the encrypted network communications are encrypted using a first protocol (e.g., SSL/TLS or another protocol for encrypted network communications); and performing an action based on the decrypted network communications between the client and the remote server.

Accordingly, various techniques for destination domain extraction for secure protocols are disclosed (e.g., by facilitating deep packet inspection of the session traffic, which can include unencrypted and possibly encrypted data communications associated with the session using a secure protocol, such as SSL/TLS). As will be apparent to one skilled in the art in view of the various techniques and embodiments described herein, while the various techniques described herein for destination domain extraction for secure protocols are described with respect to the SSL/TLS protocol, such techniques can similarly be applied to various other secure protocols (e.g., in particular, such other secure protocols that support an initial exchange of hostname/destination domain information between the client and the server as part of an initial negotiation for a secure channel/tunnel set-up).

FIG. 1 is a functional diagram of an architecture of a security device that can be used for destination domain extraction for secure protocols in accordance with some embodiments. As shown in FIG. 1, network traffic is monitored at a firewall 100. In some embodiments, network traffic is monitored using a data appliance (e.g., a data appliance that includes security functions, such as a security device/appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state-based firewall. In some embodiments, the state-based firewall can monitor traffic flows using an APP-ID engine (e.g., Application Signature Check 108). For example, the monitored network traffic can include HTTP traffic, HTTPS traffic, SSL/TLS traffic, SSH traffic, DNS requests, FTP traffic, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, HTTPS traffic, SSL/TLS traffic, SSH traffic, DNS requests, FTP traffic, unknown traffic, and various other types of traffic, and such classified traffic can be directed to an appropriate decoder, such as decoders 112, 114, and 116, to decode the classified traffic for each monitored session's traffic flow.

As also shown in FIG. 1, a known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. For example, the known protocol decoder engine can perform decoding techniques on certain secure protocols, such as SSL/TLS, to provide destination domain extraction for such secure protocols using various techniques as described herein (e.g., parsing a client hello message to extract a hostname that identifies the destination domain being requested by the client to the remote server). In addition, an unknown protocol decoder engine 116 decodes and analyzes traffic flows (e.g., applying various heuristics) and reports the monitored traffic analysis to the report and enforce policy engine 120.

As further illustrated in FIG. 1, if the monitored traffic is encrypted (e.g., encrypted using HTTPS, SSL/TLS, SSH, or another known encryption protocol), then the security device can be configured (e.g., based on a firewall policy) to decrypt the monitored traffic using a decrypt engine 110 (e.g., applying trusted man-in-the-middle techniques using a self-signed certificate). For example, in some cases, if the extracted destination domain is not trusted or unknown, then the firewall can be configured to decrypt the monitored traffic for further traffic monitoring and inspection based on a policy (e.g., a firewall policy). As another example, the firewall can be configured to decrypt the monitored traffic to verify that the extracted hostname (e.g., extracted from a client hello message) matches the domain that is being communicated with using the encrypted communications between the client and the remote server/external site.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, firewall 100 also includes a content-ID engine 122, and, in some embodiments, the content-ID engine's identified content is also used by report and enforce policy engine 120 to provide, for example, URL/category filtering, possibly in various combinations with other information, such as application, user, and/or other information, to enforce various security/firewall policies/rules.

In some embodiments, various other functional architectures and flows are provided to implement techniques for destination domain extraction for secure protocols as described herein. For example, some of these functions can be implemented in software executed on a general processor and/or some of these functions can be implemented using hardware acceleration techniques for faster packet processing of network traffic.

Figure 2:
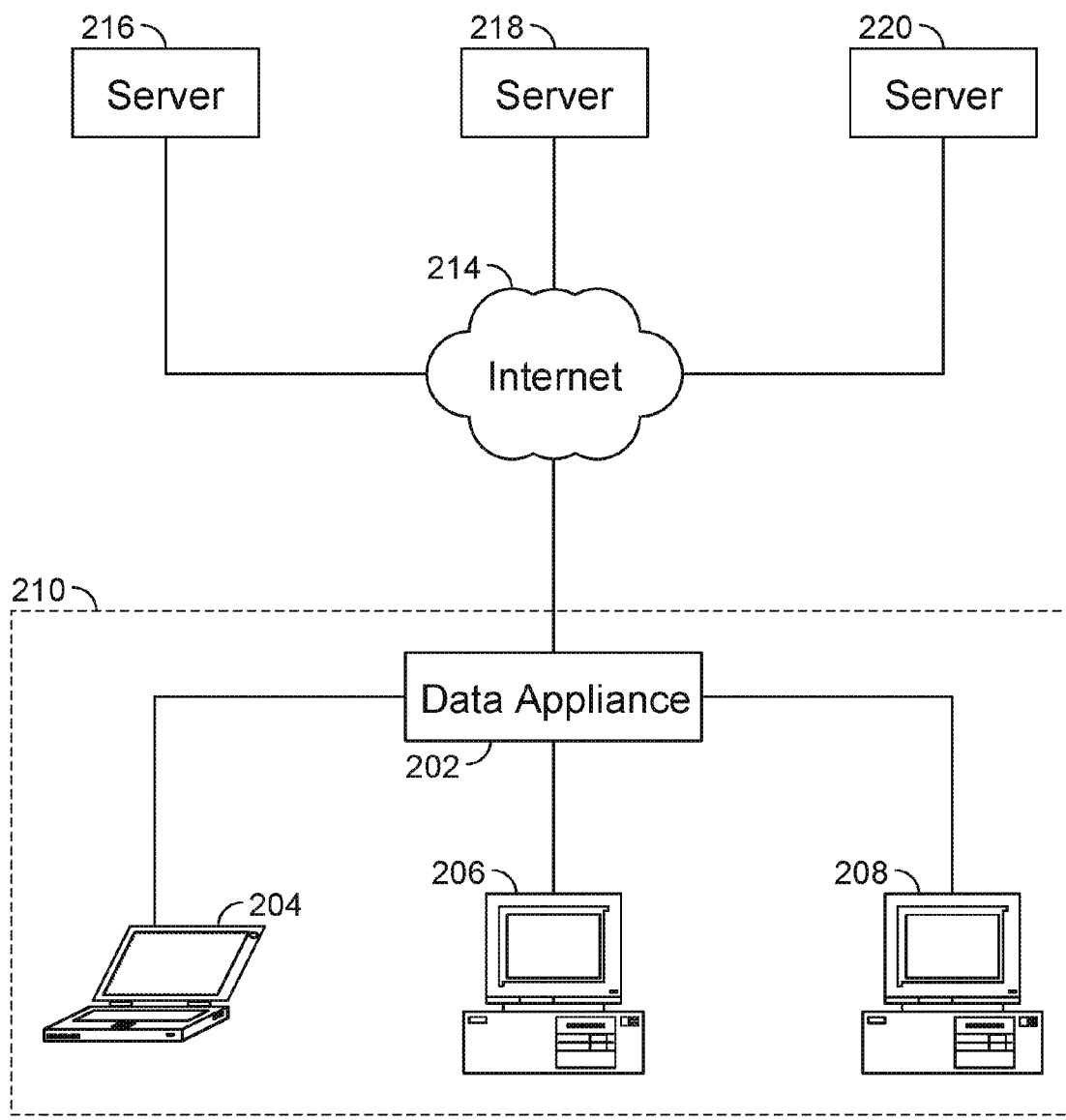
FIG. 2 is a block diagram of a network architecture that can be used for destination domain extraction for secure protocols in accordance with some embodiments.

FIG. 2 is a block diagram of a network architecture that can be used for destination domain extraction for secure protocols in accordance with some embodiments. As shown, a data appliance 202 (e.g., a data appliance that includes security functions, such as a security appliance/device that includes a firewall, a gateway that includes security functions, such as a security gateway, and/or any other device that includes a firewall function as described herein) is at the perimeter of a protected network 210, which includes clients 204, 206, and 208. Data appliance 202 includes a firewall function, such as firewall function 100 as described above, to protect the network and clients within the protected network 210, which is in communication with the Internet 214 and various remote servers, such as servers 216, 218, and 220 (e.g., web servers, mail servers, file servers, and/or other types of servers, which, for example, clients may attempt to connect to using secure protocols).

Figure 3A:
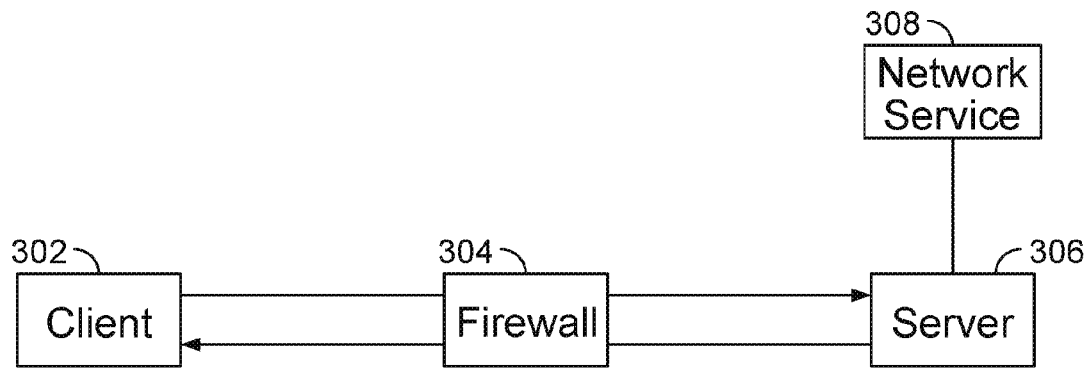
FIG. 3A is a functional block diagram illustrating an SSL/TLS session passing through a firewall that can implement destination domain extraction for secure protocols in accordance with some embodiments.

FIG. 3A is a functional block diagram illustrating an SSL/TLS session passing through a firewall that can implement destination domain extraction for secure protocols in accordance with some embodiments. In that session, a typical firewall can initially just inspect the handshake traffic (e.g., the initial negotiation to setup a secure communication channel/tunnel between a client and a remote server), as all the application data is encrypted. As shown, a client 302 establishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes requirements or rules related to destination domains that may be used for secure protocol communications). As the secure tunnel session traffic is encrypted and passes through a firewall 304, the firewall 304 typically cannot decrypt the encrypted secure tunnel session traffic and, thus, cannot detect such firewall policy/rule violation(s).

However, using various techniques described herein for destination domain extraction for secure protocols that facilitate the extraction of the destination domain by parsing the handshake traffic (e.g., parsing a client hello message to extract a hostname that identifies the destination domain being requested by the client to the remote server), the firewall 304 can apply one or more firewall policies/rules implemented by the firewall device 304 (e.g., a policy that includes requirements or rules related to destination domains that may be used for secure protocol communications) prior to and/or without having to decrypt the encrypted secure tunnel session traffic.

Specifically, when a client 302 connects to a server 306 using SSL, the server will send a Public Certificate to the client 302. This enables the client to be able to decrypt the encrypted data (e.g., application data) subsequently sent from the server. More specifically, using the SNI extension to the TLS protocol, the client can also inform the server of which host it is connecting to in step 1 of the handshake exchange, and in response, the server can provide the correct certificate in step 5 (as shown below). As would be apparent to one of ordinary skill in the art, it is also possible to perform this in HTTP, using the TLS upgrade. Below is a simplified example of such a TLS handshake exchange (e.g., handshake/negotiation) between a client (C) and a remote server (S) using the SNI approach:

Step 1. C: (TLS Handshake) Hello, I support XYZ Encryption, and I am trying to connect to 'website.example.com'.

Step 2. S: (TLS Handshake) Hi there, here is my Public Certificate, and let's use this encryption algorithm.

Step 3. C: (TLS Handshake) Agreed.

Step 4. C: (Encrypted) HTTP Request.

Step 5. S: (Encrypted) HTTP Reply.

As shown in the above example TLS handshake exchange, the client provides a hostname identification in Step 1. In particular, the client indicates in this hello message which hostname it wants to setup this secure connection with so that the server then knows which public certificate to send back to the client. As discussed above, the firewall can intercept and decode (e.g., parse) this TLS handshake exchange to extract the hostname from the client hello message in order to apply various policies based on the destination domain. As also discussed above, the firewall can also verify whether the extracted hostname matches the hostname associated with the provided Public Certificate that was sent in Step 2.

Accordingly, the various techniques described herein for destination domain extraction for secure protocols provide for efficient and robust solutions for firewalls for handling traffic using secure protocols.

In addition, various techniques for intercepting and decoding encrypted tunneling communications from a client to a remote server are disclosed herein. For example, a trusted man-in-the-middle technique that can be used for intercepting and decoding encrypted tunneling communications to further monitor such traffic in clear text (e.g., unencrypted) is described below with respect to FIG. 3B. These decryption techniques can be used in addition to and/or in combination with the various techniques described herein for destination domain extraction for secure protocols to further enhance the various security and firewall related techniques disclosed herein.

Figure 3B:
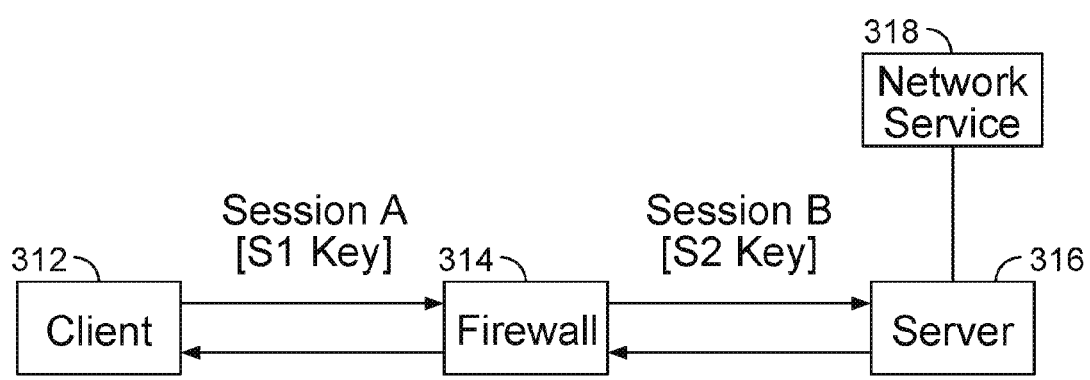
FIG. 3B is another functional block diagram illustrating the use of a firewall for destination domain extraction for secure protocols in accordance with some embodiments.

FIG. 3B is another functional block diagram illustrating the use of a firewall for destination domain extraction for secure protocols in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSL session request is intercepted and detected by the firewall 314. In response, the firewall 314 performs a trusted man-in-the-middle technique by effectively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., a create SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key S1 and forwarded to the client 312.

Thus, using these techniques the firewall 314 is between the client 312 and the server 316 and can present itself as server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing destination domain extraction for secure protocols can similarly be applied to other encrypted protocols that support tunneling.

Figure 4:
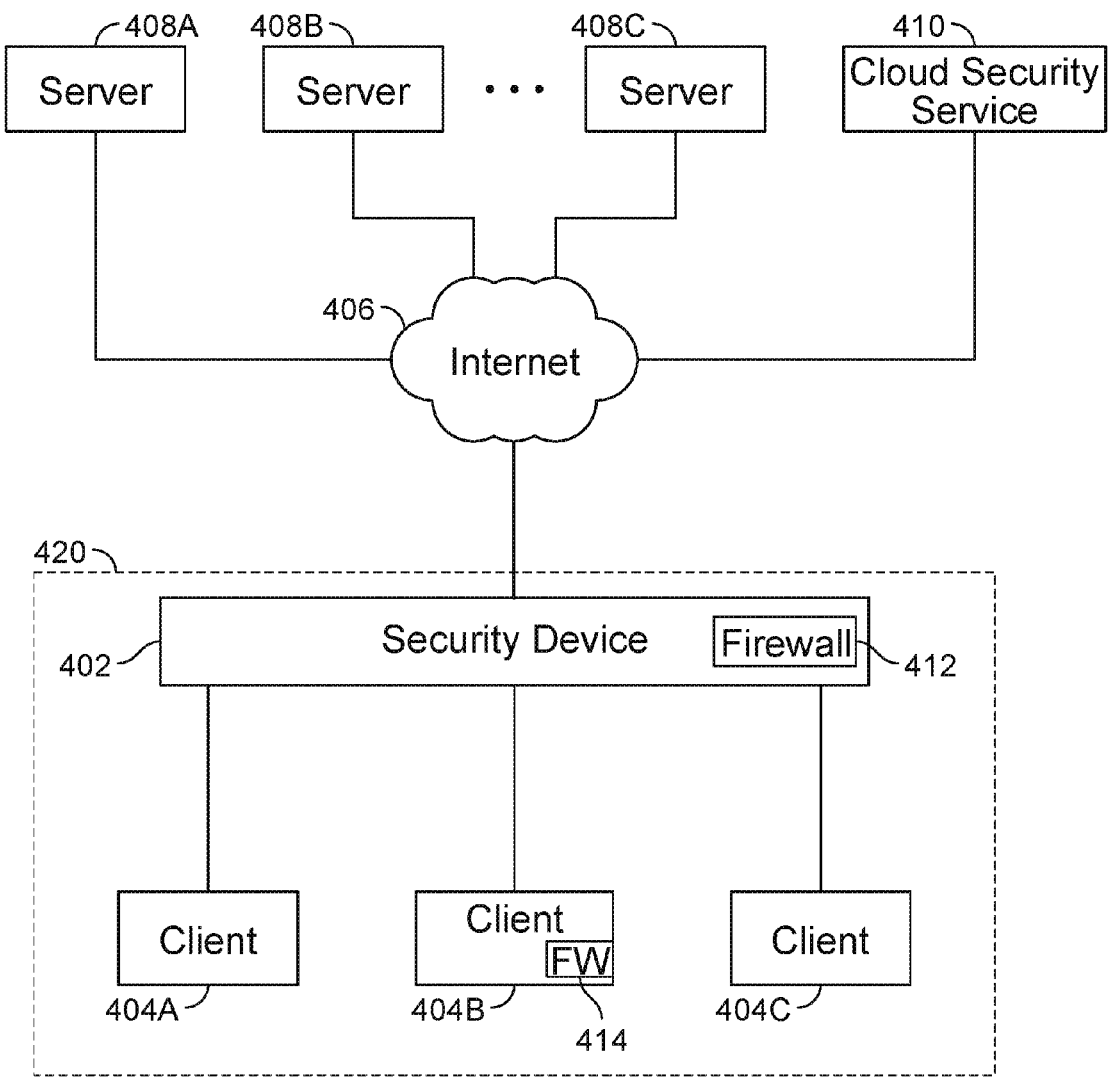
FIG. 4 is a block diagram illustrating another network architecture that can be used for destination domain extraction for secure protocols in accordance with some embodiments.

FIG. 4 is a block diagram illustrating another network architecture that can be used for destination domain extraction for secure protocols in accordance with some embodiments. As shown in FIG. 4, client devices 404A, 404B, and 404C are in communication with the Internet 406 via a security device 402. In some embodiments, the security device 402 includes a firewall 412 as shown. In some embodiments, one or more of the client devices 404A-404C include a firewall 414 (e.g., host-based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1 and 3B. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

As will now be apparent, some or all of the functions described above with respect to FIGS. 1 and 3B can be assisted by or implemented in whole or in part by the security cloud service 410. The security cloud service 410 can, for example, reduce the processing on the security device 402. As another example, detection of security policy violations and/or vulnerabilities based on destination domain extraction for secure protocols can be reported to the security cloud service 410 by the security device 402. As yet another example, the security device 402 can extract destination domain information possibly along with other extracted information using various techniques, and such extracted information can be provided to the security cloud service 410 that can facilitate identification of new, zero-day threats, new vulnerabilities, prevent false positives, and/or provide a feedback loop for any of such activities or trends aggregated and correlated using the security cloud service.

Figure 5:
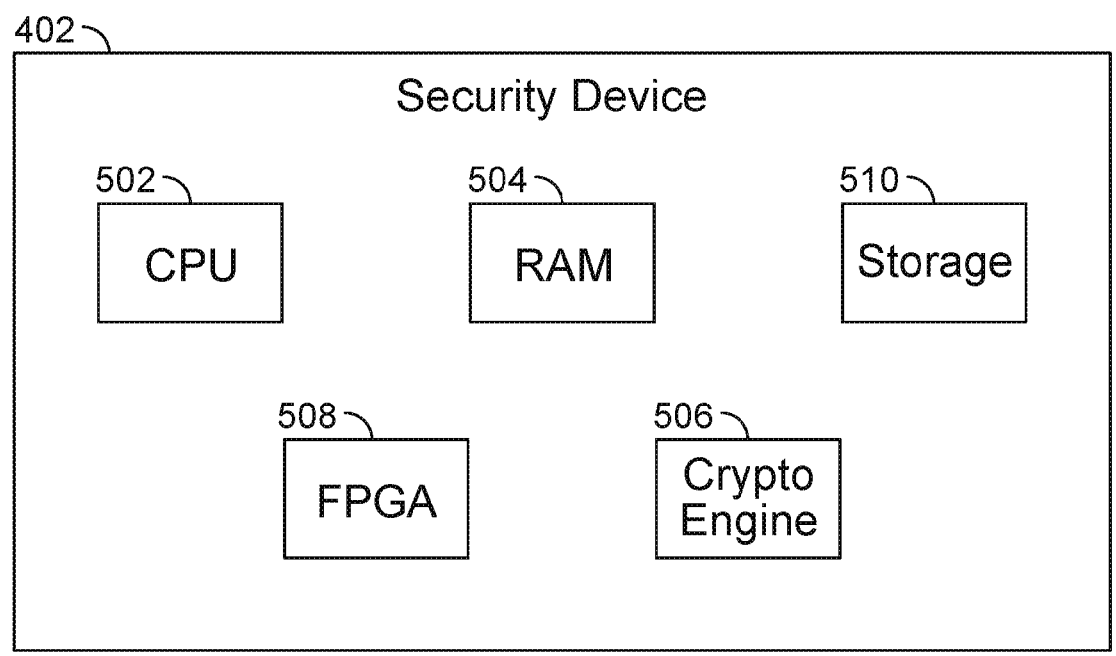
FIG. 5 is a functional diagram of hardware components of a security device for providing destination domain extraction for secure protocols in accordance with some embodiments.

FIG. 5 is a functional diagram of hardware components of a security device for providing destination domain extraction for secure protocols in accordance with some embodiments. The example shown is a representation of physical components that can be included in security device 402 (e.g., an appliance, gateway, or server). Specifically, security device 402 includes a high performance multi-core CPU 502 and RAM 504. Security device 402 also includes a storage 510 (e.g., one or more hard disks or solid state storage units), which is used to store policy and other configuration information as well as signatures. In some embodiments, storage 510 stores tables that include host names/identifiers (e.g., destination domains) and associated IP addresses and possibly other information for clients and/or remote servers identified as external sites that are monitored for implementing policies using destination domain extraction for secure protocols. Security device 402 can also include one or more optional hardware accelerators. For example, security device 402 can include a cryptographic engine 506 configured to perform encryption and decryption operations, and one or more FPGAs 508 configured to perform signature matching, act as network processors, and/or perform other tasks.

Figure 6:
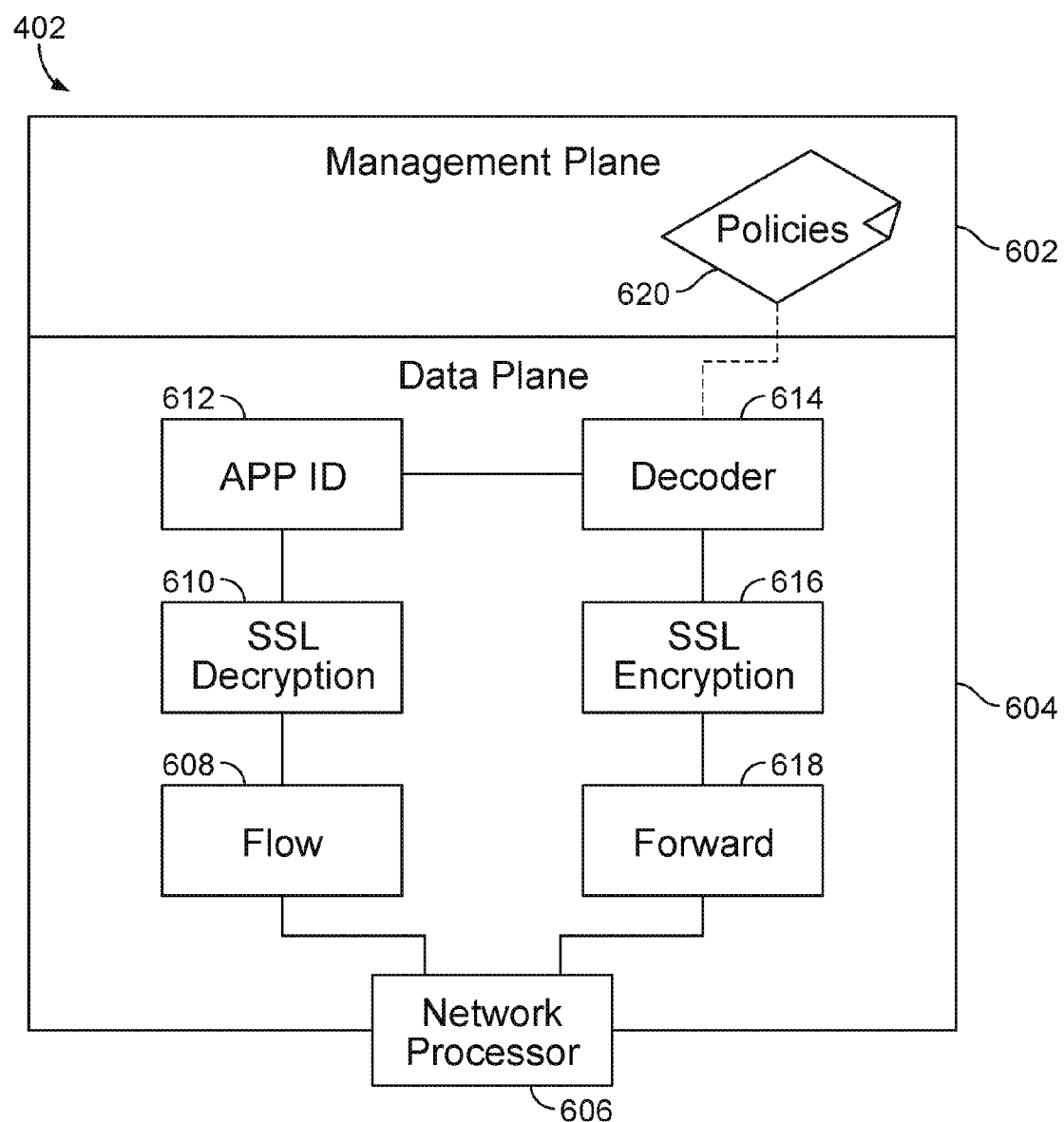
FIG. 6 is a functional diagram of logical components of a security device for providing destination domain extraction for secure protocols in accordance with some embodiments.

FIG. 6 is a functional diagram of logical components of a security device for providing destination domain extraction for secure protocols in accordance with some embodiments. The example shown is a representation of logical components that can be included in security device 402. As shown, security device 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. As described herein, an initial TLS handshake exchange of that flow can be parsed to extract a hostname to facilitate destination domain extraction for secure protocols (e.g., and to apply one or more policies if applicable based on the extracted destination domain) using various techniques described herein. If applicable (e.g., using one or more policies based on the extracted destination domain), SSL decryption is applied by SSL decryption engine 610 using various techniques as described herein. Otherwise, processing by SSL decryption engine 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information (e.g., to decode and an initial TLS handshake exchange of a flow in order to extract a hostname to facilitate destination domain extraction for secure protocols). Decoder 614 also performs signature matching to determine what should happen to the packet. SSL encryption engine 616 performs SSL encryption using various techniques as described herein. As also shown, policies 620 are received and stored in the management plane 602. In some embodiments, policy enforcement (e.g., policies can include one or more rules, which can be specified using domain and/or host/server names, and rules can apply one or more signatures or other matching criteria or heuristics, such as for matching that the decrypted traffic associated with the flow is communicating with a domain that matches the extracted destination domain) using signatures are applied as described herein with respect to various embodiments based on the monitored, decrypted, identified, and decoded session traffic flows.

Figure 7:
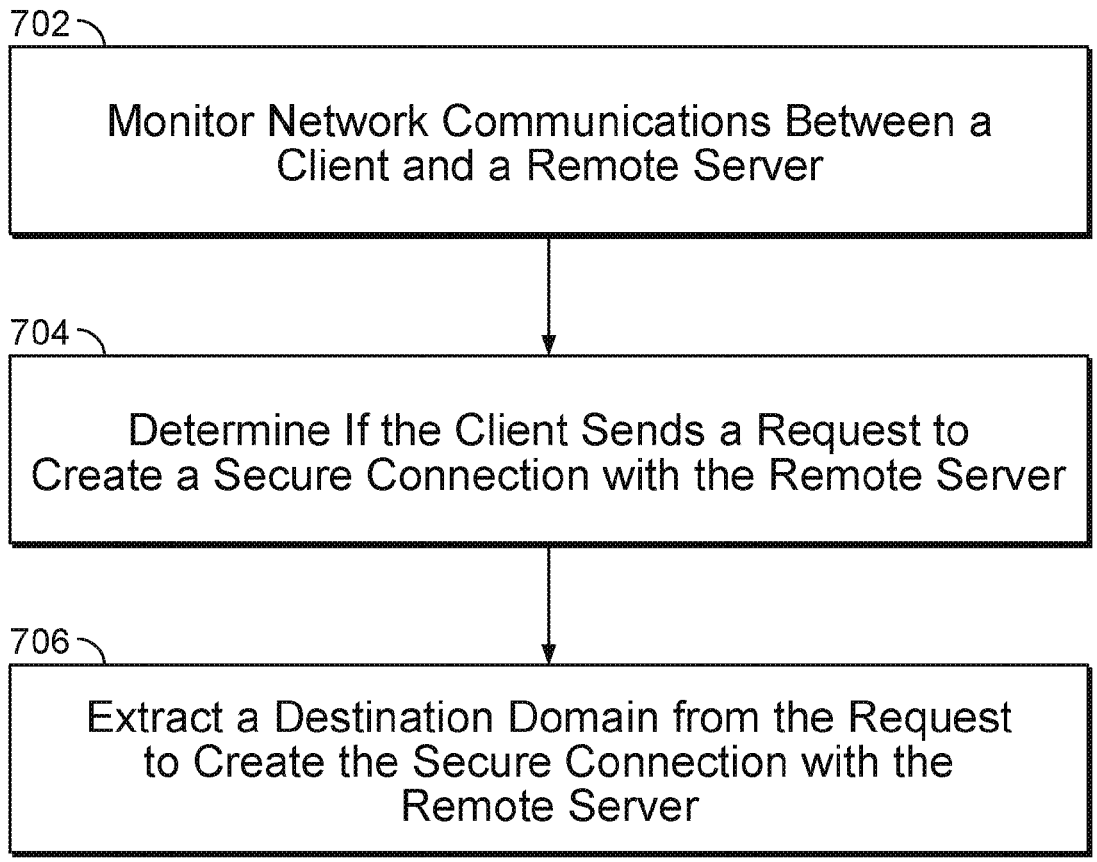
FIG. 7 is a flow diagram for providing destination domain extraction for secure protocols in accordance with some embodiments.

FIG. 7 is a flow diagram for providing destination domain extraction for secure protocols in accordance with some embodiments. At 702, monitoring network communications between a client and a remote server is performed. At 704, determining if the client sends a request to create a secure connection with the remote server is performed (e.g., in which the network communications are initiating a setup for a secure protocol-based connection). At 706, extracting a destination domain from the request to create the secure connection with the remote server is performed. In some embodiments, the secure protocol is a secure sockets layer (SSL) protocol or transport layer security (TLS) protocol, and the destination domain is extracted from the server name indication (SNI) of a client hello message sent from the client to the remote server. In some embodiments, destination domain extraction for secure protocols further includes applying a policy (e.g., a security policy) based on the destination domain to filter traffic using a security device.

Figure 8:
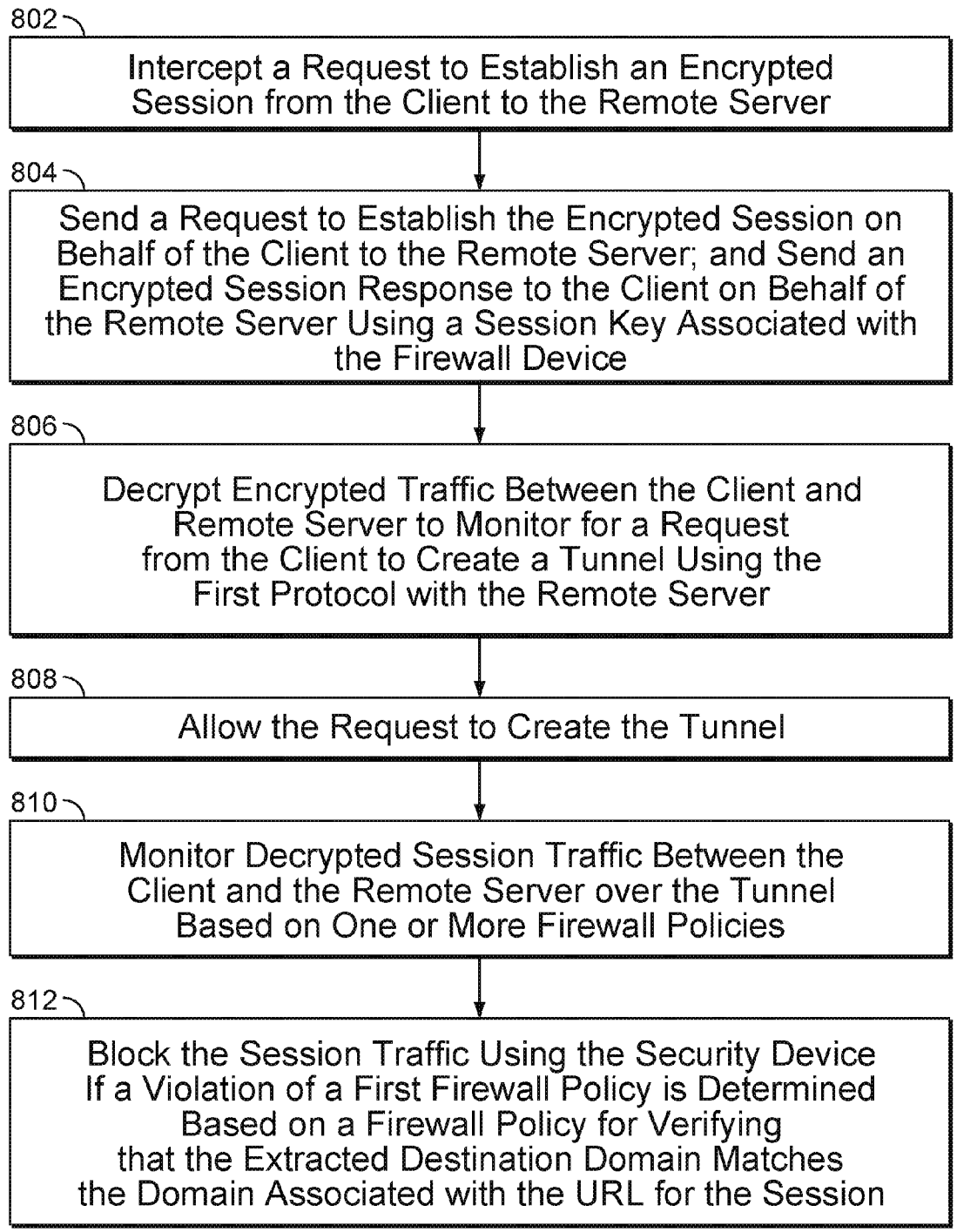
FIG. 8 is another flow diagram for providing destination domain extraction for secure protocols in accordance with some embodiments.

FIG. 8 is another flow diagram for providing destination domain extraction for secure protocols in accordance with some embodiments. At 802, intercepting a request to establish an encrypted session from the client to the remote server is performed. At 804, sending a request to establish the encrypted session on behalf of the client to the remote server is performed, and sending an encrypted session response to the client on behalf of the remote server using a session key associated with the firewall device is performed. At 806, decrypting encrypted traffic between the client and remote server to monitor for a request from the client to create a tunnel using the first protocol with the remote server is performed. At 808, allowing the request to create the tunnel is performed. At 810, monitoring decrypted session traffic between the client and the remote server over the tunnel based on one or more firewall policies is performed. At 812, blocking the session traffic using the security device is performed if a violation of a first firewall policy is determined, in which the first firewall policy includes a policy for verifying that the destination domain name extracted from a server name indication (SNI) matches the domain associated with a uniform resource locator (URL) for a session associated with the network communications between the client and the remote server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a security device;
   a processor configured to:
   monitor network communications between a client and a remote server;
   determine if the client sends a request to create a secure connection with the remote server, wherein the secure connection utilizes a secure protocol, the secure protocol being a secure sockets layer (SSL) protocol or transport layer security (TLS) protocol;
   extract a destination domain from the request to create the secure connection with the remote server, wherein the destination domain is extracted from a server name indication (SNI) of a client hello message sent from the client to the remote server, and wherein the client hello message is an unencrypted communication;
   extract a commonName identified in a public certificate sent from the remote server to the client;
   compare the extracted destination domain and the commonName identified in the public certificate;
   in the event that the extracted destination domain and the commonName do not match, provide the destination domain to a security service to identify a potential new threat; and
   in the event that the extracted destination domain and the commonName match, apply a security policy based on the destination domain to filter traffic at the security device, wherein a session associated with the network communications between the client and the remote server are decrypted to verify that the destination domain extracted from a server name indication (SNI) matches a domain associated with a uniform resource locator (URL) for the session associated with the network communications between the client and the remote server; and
   a memory coupled to the processor and configured to provide the processor with instructions.

2. The system recited in claim 1, wherein the security policy includes a malware detection policy.

3. The system recited in claim 1, wherein the security policy includes a uniform resource locator (URL)/category filtering related policy.

4. The system recited in claim 1, wherein the security policy includes a whitelist/blacklist policy.

5. The system recited in claim 1, wherein the security policy includes a whitelist/blacklist policy, and wherein a session associated with the network communications between the client and the remote server are not decrypted if the destination domain is included in a whitelist of the whitelist/blacklist policy.

6. The system recited in claim 1, wherein the security policy includes a whitelist/blacklist policy, and wherein a session associated with the network communications between the client and the remote server are decrypted if the destination domain is included in a blacklist of the whitelist/blacklist policy.

7. The system recited in claim 1, wherein the processor is further configured to:
   decrypt a monitored encrypted network communications of a session associated with the network communications between the client and the remote server to verify that the destination domain extracted from a server name indication (SNI) matches a domain associated with a uniform resource locator (URL) for the session associated with the network communications between the client and the remote server.

8. The system recited in claim 1, wherein the processor is further configured to:
   intercept a request to establish an encrypted session from the client to the remote server;
   send a request to establish the encrypted session on behalf of the client to the remote server;
   send an encrypted session response to the client on behalf of the remote server using a session key associated with the security device;

decrypt encrypted traffic between the client and the remote server to monitor for a request from the client to create a tunnel using a first protocol with the remote server;

allow the request to create the tunnel;

monitor decrypted session traffic between the client and the remote server over the tunnel based on one or more firewall policies; and block the session traffic using the security device if a violation of a first firewall policy is determined, wherein the first firewall policy includes a policy for verifying that the destination domain extracted from a server name indication (SNI) matches a domain associated with a uniform resource locator (URL) for a session associated with the network communications between the client and the remote server.

9. A method, comprising:

monitoring network communications between a client and a remote server using a security device;

determining if the client sends a request to create a secure connection with the remote server, wherein the secure connection utilizes a secure protocol, the secure protocol being a secure sockets layer (SSL) protocol or transport layer security (TLS) protocol;

extracting a destination domain from the request to create the secure connection with the remote server, wherein the destination domain is extracted from a server name indication (SNI) of a client hello message sent from the client to the remote server, and wherein the client hello message is an unencrypted communication;

extracting a commonName identified in a public certificate sent from the remote server to the client;

comparing the extracted destination domain and the commonName identified in the public certificate;

in the event that the extracted destination domain and the commonName do not match, providing the destination domain to a security service to identify a potential new threat; and in the event that the extracted destination domain and the commonName match, applying a security policy based on the destination domain to filter traffic at the security device, wherein a session associated with the network communications between the client and the remote server are decrypted to verify that the destination domain extracted from a server name indication (SNI) matches a domain associated with a uniform resource locator (URL) for the session associated with the network communications between the client and the remote server.

10. A computer program product being embodied in a tangible non-transitory computer readable storage medium and comprising computer instructions for:

monitoring network communications between a client and a remote server;

determining if the client sends a request to create a secure connection with the remote server, wherein the secure connection utilizes a secure protocol, the secure protocol being a secure sockets layer (SSL) protocol or transport layer security (TLS) protocol;

extracting a destination domain from the request to create the secure connection with the remote server, wherein the destination domain is extracted from a server name indication (SNI) of a client hello message sent from the client to the remote server, and wherein the client hello message is an unencrypted communication;

extracting a commonName identified in a public certificate sent from the remote server to the client;

comparing the extracted destination domain and the commonName identified in the public certificate;

in the event that the extracted destination domain and the commonName do not match, providing the destination domain to a security service to identify a potential new threat; and in the event that the extracted destination domain and the commonName match, applying a security policy based on the destination domain to filter traffic at a security device, wherein a session associated with the network communications between the client and the remote server are decrypted to verify that the destination domain extracted from a server name indication (SNI) matches a domain associated with a uniform resource locator (URL) for the session associated with the network communications between the client and the remote server.

* * * * *